(12) United States Patent
Mirando et al.

(10) Patent No.: US 6,238,217 B1
(45) Date of Patent: May 29, 2001

(54) VIDEO COLORING BOOK

(75) Inventors: Sal Mirando, Holmdel; Lenny Dean, Middletown, both of NJ (US)

(73) Assignee: CEC Entertainment, Inc., Irving, TX (US)

( * ) Notice: Subject to any disclaimer, the term of this patent is extended or adjusted under 35 U.S.C. 154(b) by 0 days.

(21) Appl. No.: 09/312,051

(22) Filed: May 17, 1999

(51) Int. Cl.[7] .................................................. G09B 25/00
(52) U.S. Cl. ......................... 434/365; 434/428; 434/430; 434/84; 434/85; 434/86; 707/502; 345/173; 345/180
(58) Field of Search ..................... 434/365, 373, 434/428, 429, 430, 81, 84, 85, 86, 98; 707/502, 526, 528; 345/173, 180, 182, 183, 174, 175, 176, 177, 178, 179; 273/237, 240; 463/1, 29, 30, 31, 35

(56) References Cited

U.S. PATENT DOCUMENTS

| | | | |
|---|---|---|---|
| 4,073,070 | * | 2/1978 | Boston ................................ 35/26 X |
| 4,159,417 | * | 6/1979 | Rubincam ........................ 235/375 X |
| 4,209,237 | * | 6/1980 | Meyer et al. ...................... 353/75 X |
| 4,620,770 | * | 11/1986 | Wexler ............................... 350/123 |
| 4,846,693 | * | 7/1989 | Baer ................................. 434/308 X |
| 4,855,725 | * | 8/1989 | Fernandez ....................... 340/706 X |
| 5,091,967 | * | 2/1992 | Ohsawa .............................. 382/22 X |
| 5,159,159 | * | 10/1992 | Asher ................................... 178/18 |
| 5,197,886 | * | 3/1993 | Sekiguchi ........................ 434/365 X |
| 5,213,504 | * | 5/1993 | Lee et al. ............................ 434/84 X |
| 5,219,291 | * | 6/1993 | Fong et al. ....................... 434/323 X |
| 5,252,073 | * | 10/1993 | Brotz .................................. 434/88 X |
| 5,325,473 | * | 6/1994 | Monroe et al. .................. 395/129 X |
| 5,382,233 | * | 1/1995 | Brotz .................................. 604/88 X |
| 5,450,079 | * | 9/1995 | Dunaway ........................... 341/23 X |
| 5,511,983 | * | 4/1996 | Kashii et al. .................... 434/365 X |
| 5,513,991 | * | 5/1996 | Reynolds et al. ................. 439/81 X |
| 5,533,757 | * | 7/1996 | Morris ............................ 281/15.1 X |
| 5,670,992 | * | 9/1997 | Yasuhara et al. .................... 345/173 |
| 5,671,429 | * | 9/1997 | Tanaka ............................ 395/792 X |
| 5,829,985 | * | 11/1998 | Campanella ..................... 434/317 X |
| 5,855,483 | * | 1/1999 | Collins et al. ................... 434/322 X |
| 6,000,946 | * | 12/1999 | Snyders et al. .................. 434/365 X |
| 6,034,733 | * | 3/2000 | Balram et al. ................... 348/448 X |
| 6,072,962 | * | 6/2000 | Parulski ........................... 396/311 X |

* cited by examiner

Primary Examiner—Jessica J. Harrison
Assistant Examiner—Binh-An Nguyen
(74) Attorney, Agent, or Firm—Baker & McKenzie

(57) ABSTRACT

A video coloring book includes a processor, a display device and a selecting device. The processor displays a coloring picture on the display device. The coloring picture has a plurality of selectable coloring regions. The processor further displays a plurality of selectable colors on the display device. The processor receives a first selection of one of the colors and a second selection of one of the coloring regions from the selecting device. The processor then fills the selected region with the selected color. Additional colors and/or regions can be selected. When a predetermined time expires, the processor animates the coloring picture.

20 Claims, 2 Drawing Sheets

VIDEO COLORING BOOK

FIELD OF THE INVENTION

The present invention is directed to a computerized game. More particularly, the present invention is directed to a computerized game that functions as a video coloring book.

BACKGROUND OF THE INVENTION

Since the introduction of "Pong" many years ago, video or computerized games have only increased in popularity. Some video games are adapted for video arcades. These games typically reward a high score with extra play time or with arcade tickets.

Many of today's video games involve controlling the motions of a multitude of characters, or rapidly shooting a weapon. As such, these games are not ideally suited for young children who have trouble learning how to play the games and interacting with the many required knobs and buttons.

Based on the foregoing, there is a need for a video game that is well-suited for small children, and that can be utilized in a video arcade.

SUMMARY OF THE INVENTION

One embodiment of the present invention is a video coloring book that includes a processor, a display device and a selecting device. The processor displays a coloring picture on the display device. The coloring picture has a plurality of selectable coloring regions. The processor further displays a plurality of selectable colors on the display device. The processor receives a first selection of one of the colors and a second selection of one of the coloring regions from the selecting device. The processor then fills the selected region with the selected color. Additional colors and/or regions can be selected. When a predetermined time expires, the processor animates the coloring picture.

DETAILED DESCRIPTION

Figure 1:
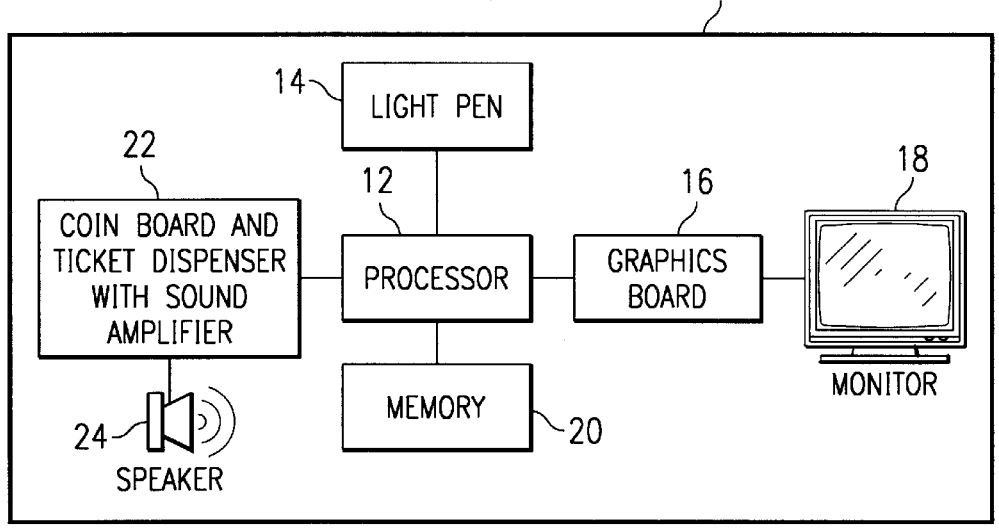
FIG. 1 is a block diagram of a video coloring book in accordance with one embodiment of the present invention.

FIG. 1 is a block diagram of a video coloring book 10 in accordance with one embodiment of the present invention. Video coloring book 10 includes a processor 12 coupled to a graphics board 16 and a monitor 18. Processor 12 can be any known computer processor. In one embodiment, processor 12 is a Pentium processor from Intel Corporation. Graphics board 16 processes data from processor 12 in a known manner to generate graphical data. Monitor 18 is a display device that receives the graphical data and displays it as an image in a known manner.

Video coloring book 10 further includes a light pen 14 coupled to processor 12. Light pen 14 allows a user to select objects or characters displayed on monitor 18 and functions as a selecting device. In other embodiments of the present invention, other alternative selecting devices can be used. For example, a mouse can be used as a selecting device. Further, a touch screen interface coupled to monitor 18 that allows a user to make a selection using their fingers can be used as a selecting device.

A memory device 20 is further coupled to processor 12. Memory device 20 may include any combination of different types of memory, including disk memory, random access memory ("RAM") or read-only memory ("ROM"). Memory device 20 stores software instructions that, when executed by processor 12, cause video coloring book 10 to perform the steps described in FIG. 3 below. Memory device 20 can also store data used by processor 12, and operating system instructions used by processor 12, as well as any other software needed by processor 12 to implement the present invention.

Video coloring book 10 further includes a coin board and ticket dispenser 22. Coin board and ticket dispenser 22 enables video coloring book 10 to be utilized in a video arcade. Coin board and ticket dispenser 22 accepts a predetermined amount of money to operate video coloring book 10, and dispenses video arcade tickets to a user. Coin board and ticket dispenser 22 further includes a sound amplifier which amplifies sound that is generated by processor 12. A speaker 24 outputs the amplified sound to the user in a known manner.

Figure 2:
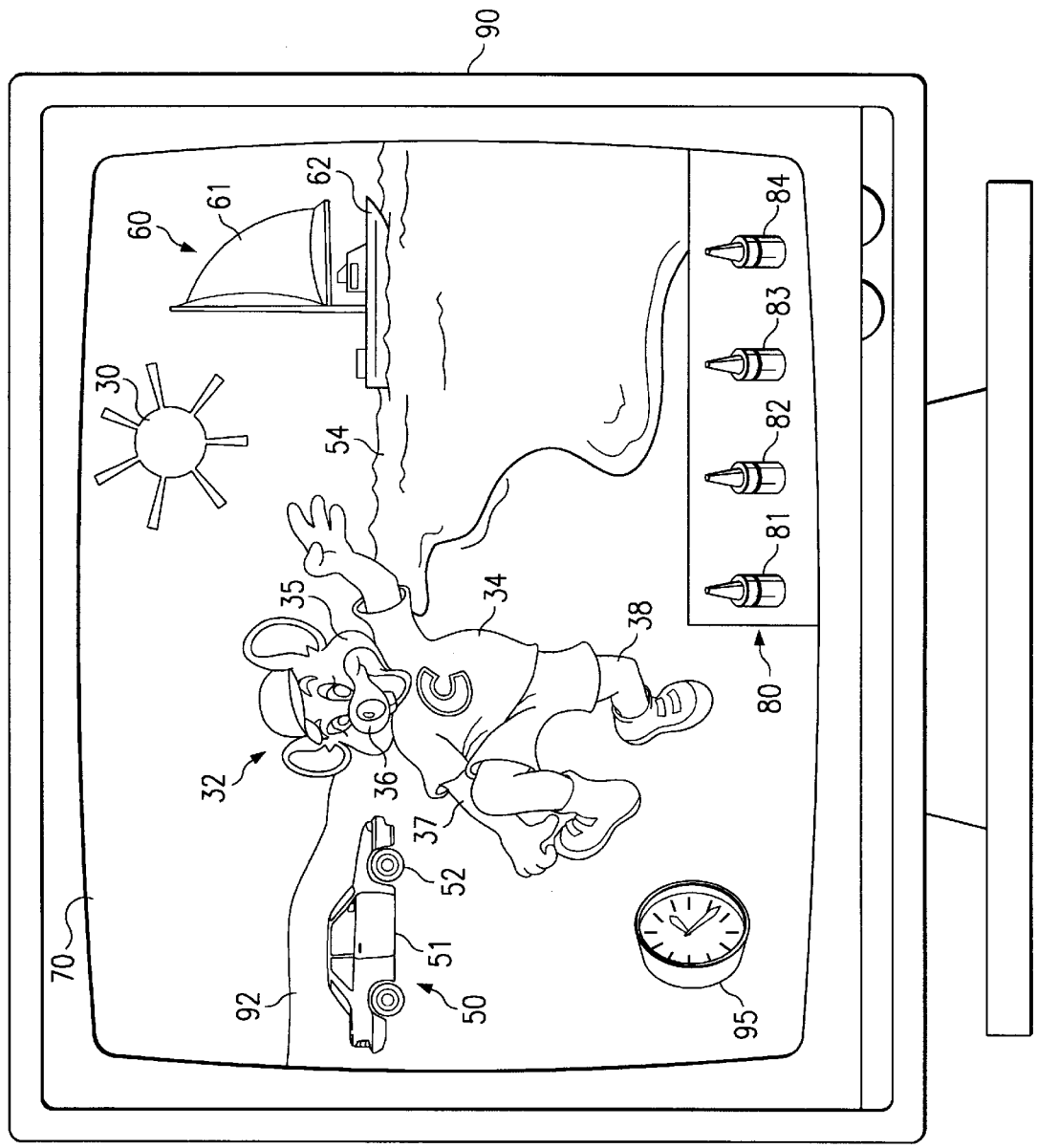
FIG. 2 is an example of an electronic coloring page in accordance with one embodiment of the present invention.

FIG. 2 is an example of an electronic coloring "page" 90 in accordance with one embodiment of the present invention. Page 90 is displayed on monitor 18 of video coloring book 10.

Page 90 includes a graphical crayon section 80 that includes a plurality of graphical crayons 81–84. Each graphical crayon 81–84 is a different color, and can be selected by the user using light pen 14. In one embodiment, nine selectable graphical crayons are displayed.

Page 90 further includes a graphical clock or timer 95. Timer 95 indicates the time remaining to the user for completing the coloring of page 90.

The remainder of page 90 is a coloring picture that can be colored by the user. The picture includes multiple objects. For example, the coloring picture of page 90 includes a sun 30, a sailboat 60, a car 50 and a mouse 32. The picture includes coloring regions that can be individually selected by light pen 14. For example, mouse 32 includes regions 34–38. Boat 60 includes regions 61 and 62. Car 50 includes regions 51 and 52. Other regions in the picture of page 90 include a sky 70, an ocean 54, and a beach 92. Some regions may be linked together, so that selecting one may include the selection of another region. For example, selecting region 37 of mouse 32 may also automatically select region 38.

The picture of page 90 is initially presented to the user in black and white (i.e., the lines are black on a white background). As the user selects a region of the picture, that region is automatically filled with the color corresponding to a previously selected graphical crayon 81–84.

Figure 3:
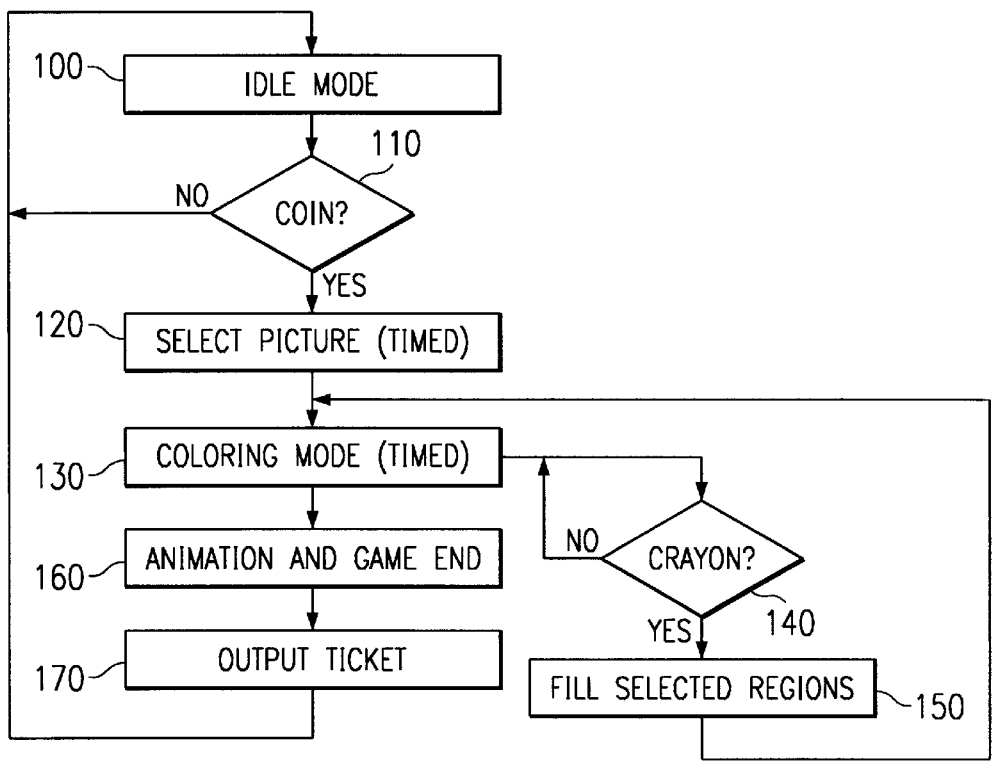
FIG. 3 is a flowchart of steps performed by the video coloring book in accordance with one embodiment of the present invention.

FIG. 3 is a flowchart of steps performed by video coloring book 10 in accordance with one embodiment of the present invention. In one embodiment, the steps are stored as software instructions in memory device 20 and are executed by processor 12. In other embodiments, the steps can be performed by any combination of hardware or software.

At step 100, video coloring book 10 is in idle mode. In idle mode, video coloring book 10 repeats a fixed sequence of graphics through monitor 18 and sound though speaker 24. The idle mode is used to attract the user to video coloring book 10.

At step 110, video coloring book 10 determines whether a predetermined number of coins have been inserted in coin board and ticket dispenser 22. Processor 12 constantly polls coin board and ticket dispenser 22 to receive an indication that the coins have been inserted. If the coins have not been inserted, step 100 is repeated.

If the coins have been inserted at step 110, then at step 120 video coloring book 10 allows the user to select a coloring picture to be colored. A choice of pictures is displayed on monitor 18. In one embodiment, twelve different pictures are available, and a subset of four randomly chosen pictures out of the twelve are displayed at step 120. Video coloring book 10 then waits until one of the displayed pictures is selected using light pen 14. If no pictures are selected within a predetermined time period (e.g., 30 seconds), then one of the pictures is automatically selected for the user.

At step 130, a coloring mode is executed. In this mode, at step 140 video coloring book 10 waits until one of graphical crayons 81–84 is selected. When a crayon is selected, coloring book 10 waits for one or more regions of the coloring page to be selected. When each region is selected, that region is automatically filled with the color corresponding to the selected crayon. The user can then select a different crayon at step 140, and select additional or previously selected regions at step 150. These selected regions will then be filled with the color corresponding to the newly selected crayon.

In one embodiment, coloring mode 130 is timed so that it automatically ends and step 160 is executed after the expiration of a predetermined time period (e.g., one minute). Clock 95 of FIG. 2 provides an indication of when the time period expires. When time has expired, any region not selected by the user will automatically be filled with a predetermined color.

In another embodiment, coloring mode 130 is ended when all regions of the coloring picture have been selected by the user.

At step 160, the picture is animated while retaining the colors chosen in step 130. Animation includes displaying multiple frames of the picture (e.g., 60–90 frames) in sequence on monitor 18 so that it appears that the objects of the picture are moving. For example, referring to FIG. 2, the animation may include mouse 32 walking, car 50 moving forward, and boat 60 bobbing up and down on the ocean. The animation includes sound that is synchronized with the moving objects. The animation indicates to the user that the game has ended.

Finally, at step 170, arcade tickets are output to the user via coin board and ticket dispenser 22. In one embodiment, a fixed number of tickets are always output. In another embodiment, the number of tickets may vary depending upon the speed in which the user completed choosing all of the regions of the picture. Video coloring book 10 then moves back to step 100.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A video coloring book comprising:
   a processor;
   a display device coupled to said processor;
   a selecting device coupled to said processor;
   a memory device coupled to said processor; and
   a set of instructions stored in said memory device;
   wherein said instructions, when executed by said processor, cause said processor to:
   display a coloring picture on said display device, said coloring picture having a plurality of selectable coloring regions;
   display a plurality of selectable colors on said display device;
   receive a first selection of one of said colors from said selecting device;
   receive a second selection of one of said regions from said selecting device;
   fill said selected region with said selected color; and
   animate said coloring picture.

2. The video coloring book of claim 1, wherein said processor animates said coloring picture when all of said regions are selected.

3. The video coloring book of claim 1, wherein said processor animates said coloring picture when a duration of time expires.

4. The video coloring book of claim 1, further comprising:
   a coin board and ticket dispenser coupled to said processor.

5. The video coloring book of claim 1, wherein said selecting device is a light pen.

6. The video coloring book of claim 1, wherein said processor animates said coloring picture by displaying a plurality of frames of said coloring picture.

7. The video coloring book of claim 4, wherein said processor causes said coin board and ticket dispenser to dispense one or more tickets after said coloring picture is animated.

8. A method of operating a video coloring book, said method comprising:
   displaying a coloring picture, said coloring picture having a plurality of selectable coloring regions;
   displaying a plurality of selectable colors;
   receiving a first selection of one of said colors;
   receiving a second selection of one of said regions;
   filling said selected region with said first selection of colors; and
   animating said coloring picture.

9. The method of claim 8, wherein said coloring picture is animated when all of said regions are selected.

10. The method of claim 8, wherein said coloring picture is animated when a duration of time expires.

11. The method of claim 8, wherein animating said coloring picture comprises displaying a plurality of frames of said coloring picture.

12. The method of claim 8, further comprising:
    dispensing one or more tickets after said coloring picture is animated.

13. The method of claim 8, further comprising:
    receiving a third selection of one of said colors;
    receiving a fourth selection of one of said regions, said fourth selection identical to said second selection; and
    filling said selected region with said third selection of colors.

14. A video coloring book comprising:
    means for displaying a coloring picture, said coloring picture having a plurality of selectable coloring regions;
    means for displaying a plurality of selectable colors;
    means for receiving a first selection of one of said colors;

means for receiving a second selection of one of said regions;

means for filling said selected region with said first selection of colors; and means for animating said coloring picture.

15. The video coloring book of claim 14, wherein said coloring picture is animated when all of said regions are selected.

16. The video coloring book of claim 14, wherein said coloring picture is animated when a duration of time expires.

17. The video coloring book of claim 14, wherein said means for animating comprises means for displaying a plurality of frames of said coloring picture.

18. The video coloring book of claim 14, further comprising:

means for dispensing one or more tickets after said coloring picture is animated.

19. The video coloring book of claim 14, further comprising:

means for receiving a third selection of one of said colors;

means for receiving a fourth selection of one of said regions, said fourth selection identical to said second selection; and means for filling said selected region with said third selection of colors.

20. A computer-readable medium having stored thereon instructions which, when executed by a processor, cause said processor to:

display a coloring picture, said coloring picture having a plurality of selectable coloring regions;

display a plurality of selectable colors;

receive a first selection of one of said colors;

receive a second selection of one of said regions;

fill said selected region with said first selection of colors; and animate said coloring picture.

* * * * *